US008023818B2

(12) United States Patent
Schmidt et al.

(10) Patent No.: US 8,023,818 B2
(45) Date of Patent: Sep. 20, 2011

(54) ARTICULATING INFRARED WINDOW

(75) Inventors: Roger Schmidt, Shorewood, MN (US); Michael Stuart, Issaquah, WA (US)

(73) Assignee: Fluke Corporation, Everett, WA (US)

( * ) Notice: Subject to any disclaimer, the term of this patent is extended or adjusted under 35 U.S.C. 154(b) by 213 days.

(21) Appl. No.: 12/179,192

(22) Filed: Jul. 24, 2008

(65) Prior Publication Data

US 2010/0020389 A1    Jan. 28, 2010

(51) Int. Cl.
*G03B 17/48* (2006.01)
(52) U.S. Cl. ......... 396/429; 359/356; 359/894; 312/409
(58) Field of Classification Search .............. 396/429; 359/350, 351, 356, 894, 809, 355; 250/236; 244/3.16; 126/633; 312/409
See application file for complete search history.

(56) References Cited

U.S. PATENT DOCUMENTS

| | | | | |
|---|---|---|---|---|
| 4,085,910 A * | 4/1978 | Baker et al. | ............. | 244/3.16 |
| 4,240,596 A * | 12/1980 | Winderman et al. | ......... | 244/3.16 |
| 4,365,620 A * | 12/1982 | Bliamptis | ................. | 126/633 |
| 4,466,019 A | 8/1984 | Sakashita | | |
| 4,717,822 A * | 1/1988 | Byren | ..................... | 250/236 |
| 4,960,995 A * | 10/1990 | Neumann et al. | ............. | 250/347 |
| 5,986,211 A | 11/1999 | Greer et al. | | |
| 6,097,029 A * | 8/2000 | Downie et al. | ............... | 250/330 |
| 6,277,297 B1 * | 8/2001 | Klocek | ............... | 252/62.3 GA |
| 6,798,587 B2 * | 9/2004 | Irani | ..................... | 359/809 |
| 7,641,402 B2 * | 1/2010 | Kocanda et al. | ............. | 396/427 |
| 2006/0043303 A1* | 3/2006 | Safai et al. | .................. | 250/347 |
| 2010/0014152 A1* | 1/2010 | Robinson | ..................... | 359/350 |
| 2010/0103509 A1* | 4/2010 | Robinson | ..................... | 359/356 |

OTHER PUBLICATIONS

"Can I use IR windows if there is no access to the connections that I want to see?", Global Maintenance Technologies Ltd., United Kingdom, Jan. 6, 2009.
"Data Centre Case Study", Global Maintenance Technologies Ltd., United Kingdom, Aug. 17, 2006.
IRISS® VPF(R) Infra Red Inspection Support Systems announcement, Global Maintenance Technologies Ltd., United Kingdom, Aug. 17, 2006.
"Infra Red Inspection Windows: The Way Forward", Global Maintenance Technologies Ltd., United Kingdom, Nov. 9, 2005, 23 pages.
"Infra Red Inspection Windows: Where do I start?", Global Maintenance Technologies Ltd., United Kingdom, Aug. 17, 2006, 6 pages.
"The iR-iD™ Infra Red Label System", Global Maintenance Technologies Ltd., United Kingdom, Aug. 17, 2006.
"IRISS® Infra Red Inspection Support Systems: The Professional Choice", Global Maintenance Technologies Ltd., United Kingdom, Aug. 17, 2006.
"IRISS® Infra Red Inspection Windows: What Can I see through an infra red window?", Global Maintenance Technologies Ltd., United Kingdom, Aug. 17, 2006.

(Continued)

*Primary Examiner* — Clayton E Laballe
*Assistant Examiner* — Warren K Fenwick
(74) *Attorney, Agent, or Firm* — Fredrikson & Byron, P.A.

(57) ABSTRACT

An articulating infrared window to be installed into a panel of a cabinet is disclosed. The window includes a window housing and an infrared transparent pane. The infrared transparent pane is installed within the window housing. Embodiments of the window housing can include various articulation mechanisms including individually or in combination a double gimbal assembly, a single gimbal and rotary stage, a ball and socket joint, and an extension joint (such as a bellows) for articulating the infrared transparent pane.

21 Claims, 15 Drawing Sheets

OTHER PUBLICATIONS

Products Profile: IRISS Infra Red Inspection Windows, Global Maintenance Technologies Ltd., United Kingdom, Aug. 31, 2006, 6 pages.
"IRISS® Infra Red Inspection Support Systems: iR-P. Infra Red Lens Protection Systems", Global Maintenance Technologies Ltd., United Kingdom, Aug. 17, 2006.
"Infra Red Panel Modifications", Global Maintenance Technologies Ltd., United Kingdom, Jul. 12, 2006.
Gierlach, "Preventive Maintenance Pays", TEGG Corporation, Pittsburgh, PA, Aug. 29, 2006.

* cited by examiner

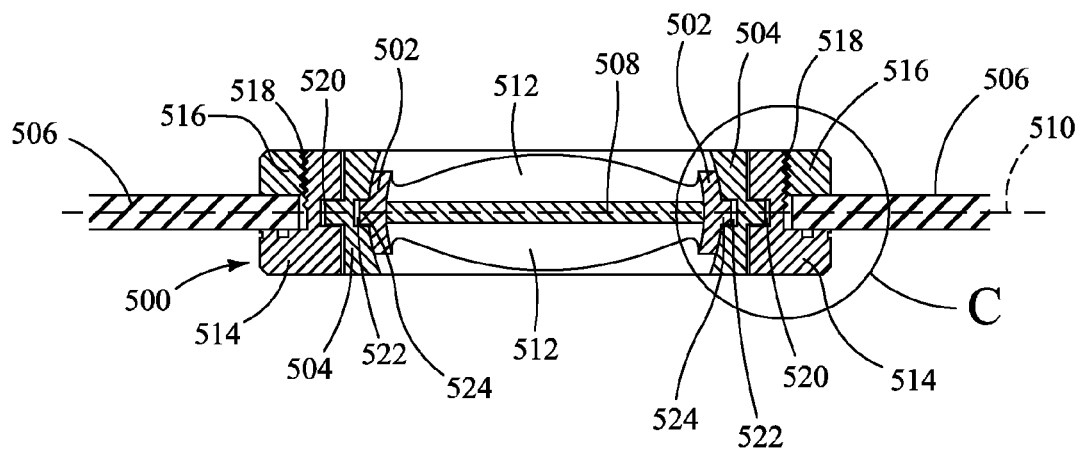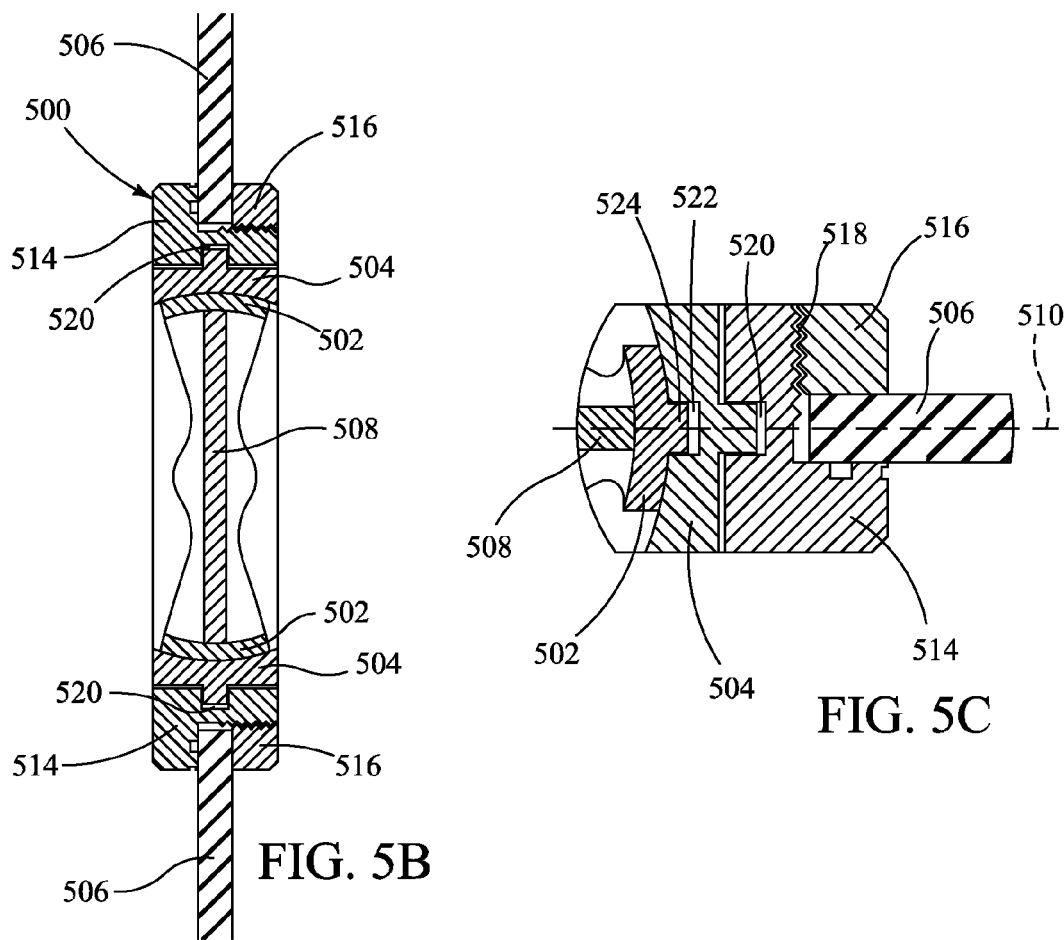

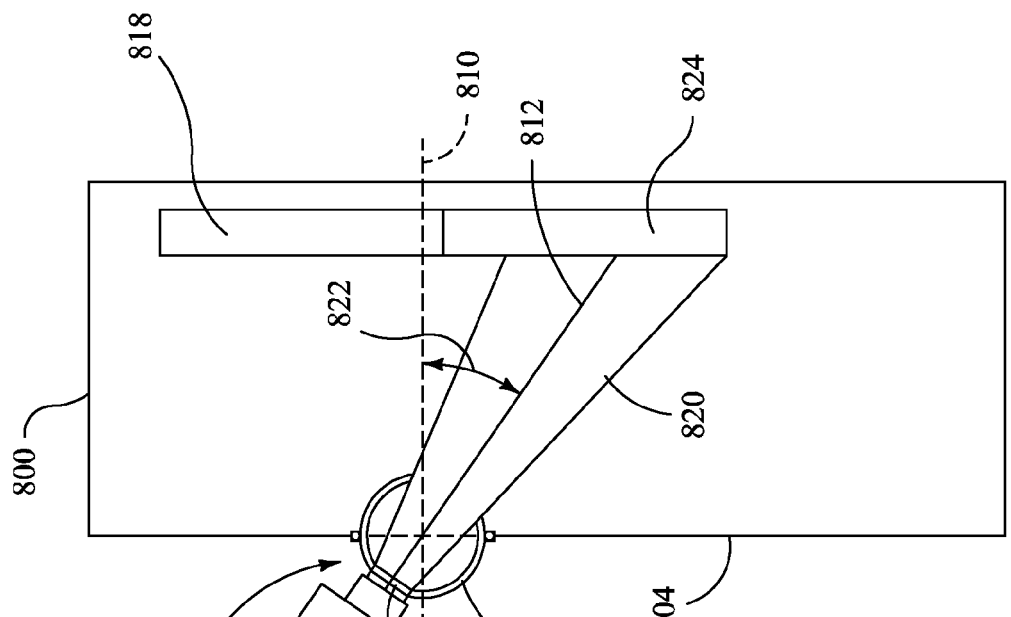
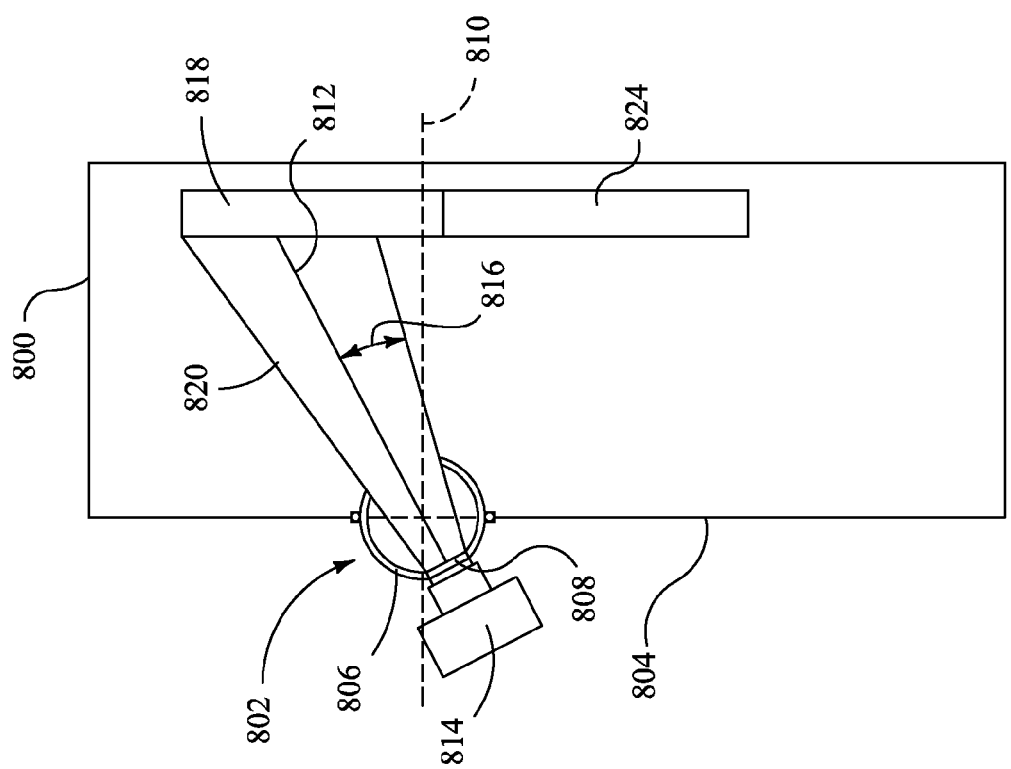
FIG. 8B
FIG. 8A

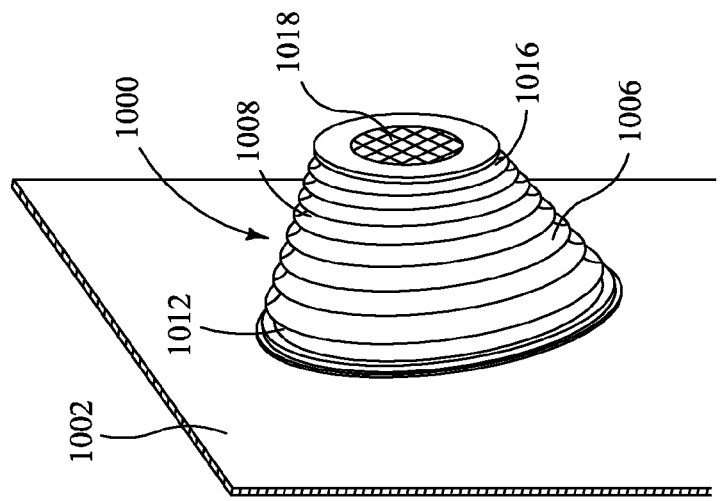
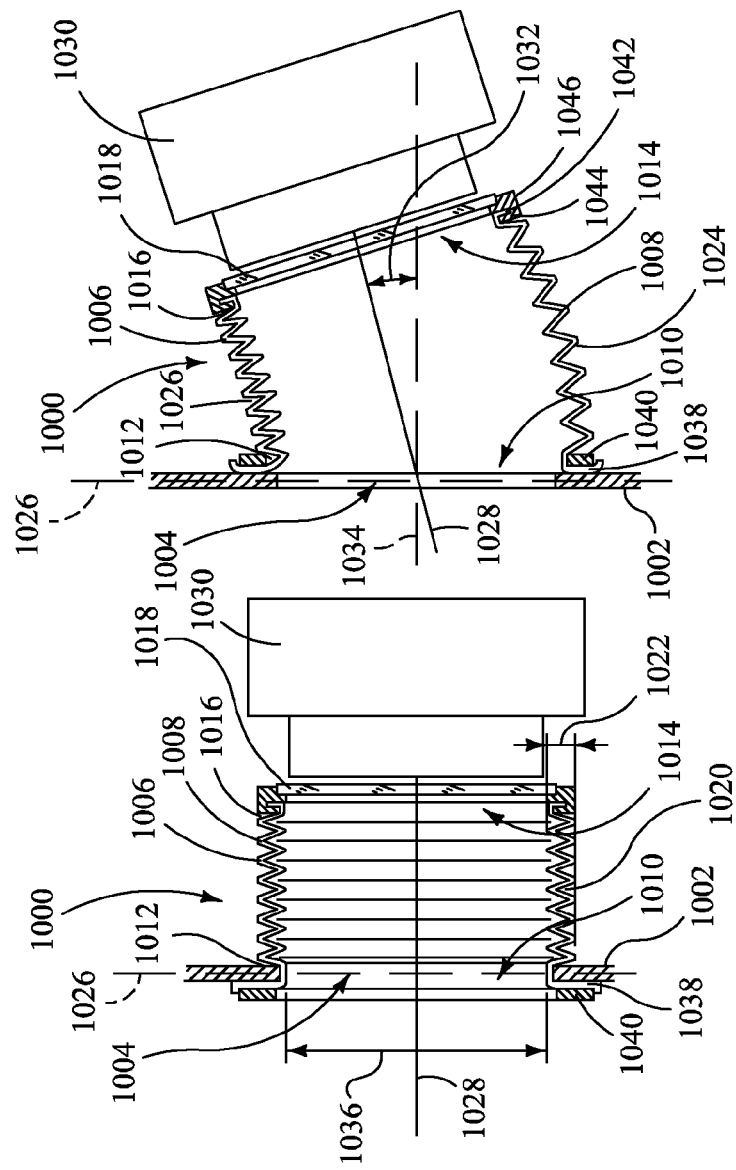
FIG. 10A FIG. 10B FIG. 10C

ARTICULATING INFRARED WINDOW

FIELD OF THE INVENTION

This invention relates generally to the field of thermography and more particularly to the thermal imaging of components within an enclosed cabinet.

BACKGROUND

Infrared (IR) imaging has increasingly been used in the preventative maintenance of high voltage electrical circuits and components. An IR image of the components can often reveal hot spots which may indicate malfunctioning, improperly connected, or overloaded components. Timely identification of problem components can save on system downtime and expenses associated with replacing blown or destroyed components.

To effectively inspect electrical components, a thermographer should view the components with an IR camera while the components are operating or energized. However, this can be difficult because electrical components are often kept in high voltage electrical cabinets. Because an IR camera requires a line of sight to deliver a suitably accurate thermal image, components within a cabinet cannot be imaged adequately without either opening the cabinet or providing some other view into the cabinet.

Opening a high voltage electrical cabinet while the components within are energized poses a risk of arc flashing. To avoid this risk, most cabinets include door interlocks which require that the components within be powered off before the cabinet can be opened. But when the power is turned off the components within the cabinet begin to cool and heat within the cabinet is rapidly dissipated or redistributed. This rapid heat dissipation precludes adequate identification of hot spots in a particular thermal image.

As an alternative to imaging cool components by opening the cabinet door, the thermography industry has placed fixed IR transmitting windows in a panel or door of high voltage electrical cabinets. These windows can provide a line of sight within the cabinet so that it may be inspected without being opened while the components within are energized. However, the view into the cabinet is limited through a single fixed window which usually cannot provide a view of all components or areas to be inspected. Some vendors have proposed the installation of multiple windows in a single cabinet, but this approach can be expensive to implement and inefficient for a thermographer having to maneuver to inspect the cabinet at each window location.

Others have addressed the limited view problem by adding an expensive wide angle lens to the inspection camera in addition to the fixed window or a small open portal. Such a lens may provide an increased field of view within a cabinet, but it also requires the user to exchange lenses to switch between this application and other thermography applications where a narrower field of view is preferred. Moreover in many cabinet applications, it is desirable to use a standard field of view camera because such a camera provides higher spatial resolution images of devices in the cabinet.

SUMMARY

Certain embodiments of the articulating IR window of the invention include a kit for installation into a panel of a cabinet. The articulating IR window kit includes a window housing mounted within the panel and providing an aperture to the interior of the cabinet. At least a portion of the window housing is articulatable. Coupled to the articulating window about the aperture, is an IR transparent window pane. Articulation of the window housing or a portion thereof can provide for articulation of the IR transparent pane relative to the panel while allowing the cabinet to remain generally enclosed. Embodiments of the window housing can include various articulatable arrangements including a double gimbal assembly, a single gimbal and rotary stage, a ball and socket joint, an extension joint (such as a bellows), or a combination of these arrangements.

Some embodiments include a cabinet having an articulating IR window installed in a panel thereof. The cabinet includes a plurality of panels defining an interior. At least one of the panels includes an opening to the interior. A window housing is coupled to the panel about the panel opening and adapted to receive an IR transparent pane covering the opening. The IR transparent pane is configured to be articulatable relative to the panel. Embodiments of the cabinet can include various articulatable window housing arrangements including a ball and socket joint, an extension joint (such as a bellows), a double gimbal assembly, a single gimbal assembly with rotation stage or a combination of these arrangements.

Also in accordance with the invention, a method of imaging components on the interior of a cabinet is provided. A camera is connected to or pressed against an articulating IR window mounted within a panel of the cabinet. The articulating IR window includes a window housing providing an aperture to the interior of the cabinet. The articulating IR window also includes an IR transparent pane coupled to the window housing. The IR transparent pane is coupled substantially coextensive with the aperture in the window housing and is articulatable relative to the panel while allowing the cabinet to remain completely enclosed. A receiving assembly operably connected to the window housing is adapted to receive the camera. The camera is then articulated relative to the panel of the cabinet, thereby causing the IR transparent pane to articulate relative to the panel.

Some embodiments of the invention can provide a view to the interior of an electrical cabinet without requiring the cabinet to be opened or components within to be powered off. Additionally, some embodiments can provide a wide angle view within a cabinet for a camera having a standard field of view.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

FIG. 5A is a side-sectional view of the embodiment of FIG. 5 from the perspective of broken line A.

FIG. 5B is a side-sectional view of the embodiment of FIG. 5 from the perspective of broken line B.

FIG. 5C is a side-sectional view of the detail area C of FIG. 5A.

FIG. 8A is a side-sectional view of a cabinet having an articulating IR window depicting the field of view of camera through a pane articulated down from center.

FIG. 8B is a side-sectional view of a cabinet having an articulating IR window depicting the field of view of camera through a pane articulated up from center.

FIG. 10A is a side-sectional view of an articulating IR window including a bellows installed within a panel.

FIG. 10B is a side-sectional view of an articulating IR window including a bellows installed within a panel wherein the pane has been articulated up from center.

FIG. 10C is a perspective view of a panel having an articulating IR window including a tapered bellows installed according to some embodiments.

DETAILED DESCRIPTION OF THE DRAWINGS

Figure 1:
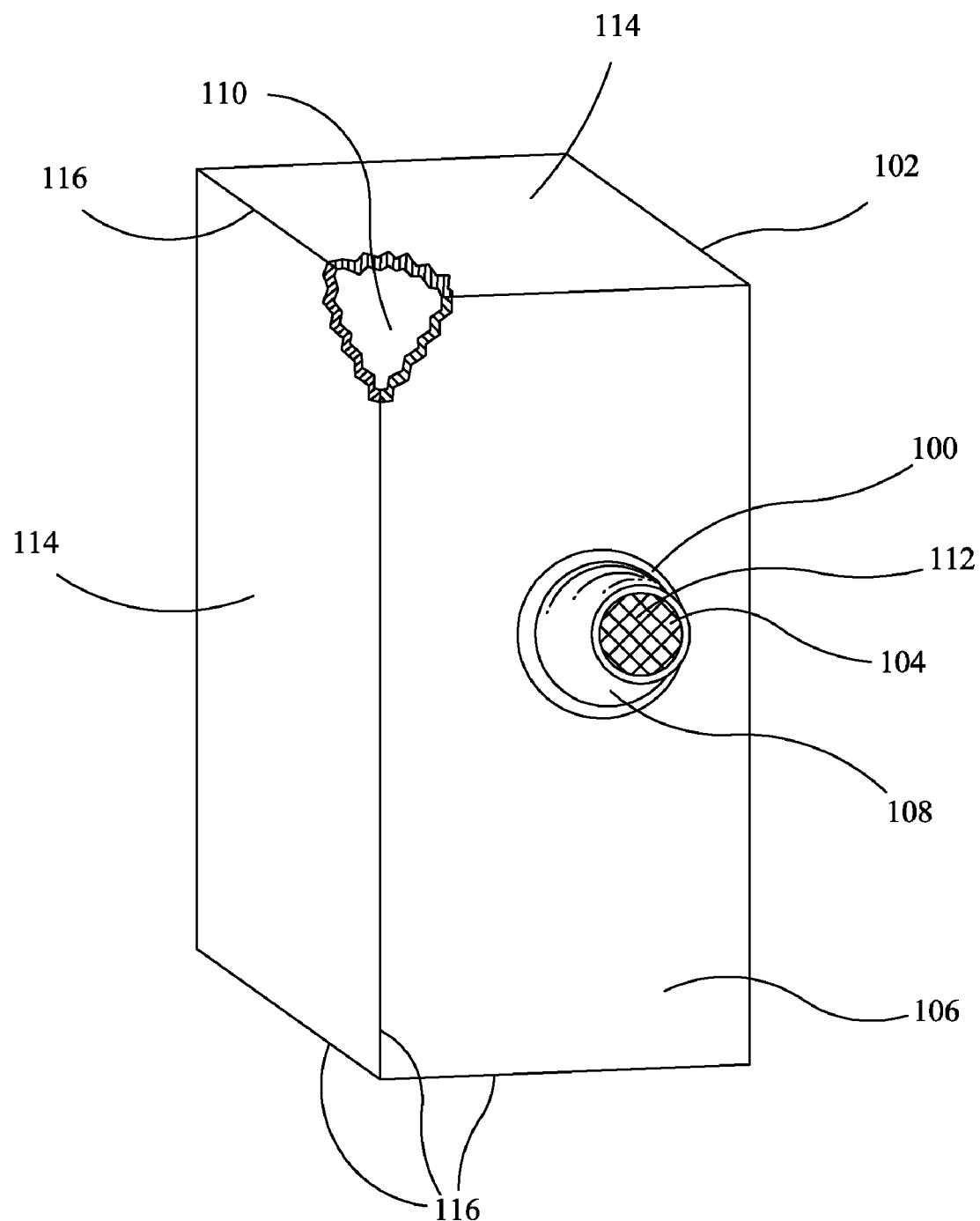
FIG. 1 is a perspective view of a cabinet having an articulating IR window installed according to some embodiments of the invention.

For the purpose of promoting an understanding of the principles of the invention, reference will now be made to the embodiments illustrated in the drawing and specific language will be used to describe the same. It will, nevertheless, be understood that no limitation of the scope of the invention is thereby intended; any alterations and further modifications of the described or illustrated embodiments, and any further applications of the principles of the invention as illustrated therein, are contemplated as would normally occur to one skilled in the art to which the invention relates.

FIG. 1 shows an articulating IR window 100 according to an embodiment of the invention installed in a cabinet 102. Embodiments of the invention provide an IR transparent pane 104 articulatable relative to a panel 106 of the cabinet 102 within which the pane 104 is mounted. Embodiments include a window housing 108 adapted to be mounted within the panel 106, such that the window housing 108 provides an aperture to the interior of the cabinet. The IR transparent pane 104 seals the aperture so that the cabinet 102 remains completely enclosed, while also providing a view for thermal imaging of components within the interior of the cabinet 110. The articulatability of the IR transparent pane 104 allows a substantial portion of the interior of the cabinet 110 to be viewed through a single window pane without the need for a wide angle lens or specially adapted IR camera. The use of a standard field of view camera not only provides for high spatial resolution images of devices in the cabinet but also enables using the same camera with no change for other applications where narrower field of view is preferred.

Figure 2:
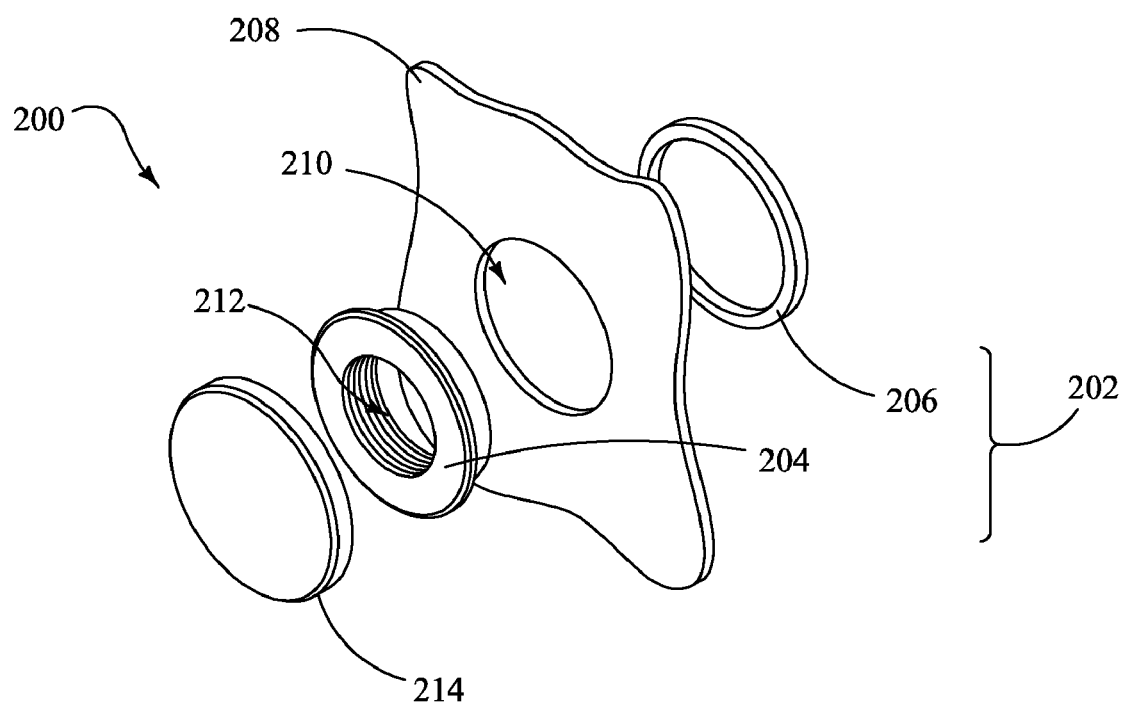
FIG. 2 is an exploded side view of an embodiment of an articulating IR window including a gimbal joint according to some embodiments of the invention.

In some embodiments, the window housing can include a gimbal mechanism. FIG. 2 shows an exploded view of an installation of such an articulating IR window 200. The window housing 202 includes an outer housing piece 204 and inner housing piece 206, adapted to engage panel 208 about panel opening 210 to secure the articulating IR window 200 in place. The IR transparent pane 212 and gimbal mechanism are disposed within the outer housing piece 204. Some embodiments include a cover 214, removably installable about the window housing 202 to protect the IR pane 212 and maintain the integrity of the cabinet when not in use. A cover 214 can be installable about the window housing 202 by any suitable means, for example, the cover can be screw-on, snap-on, clip-on, bolt-on or other connection type.

Figure 3:
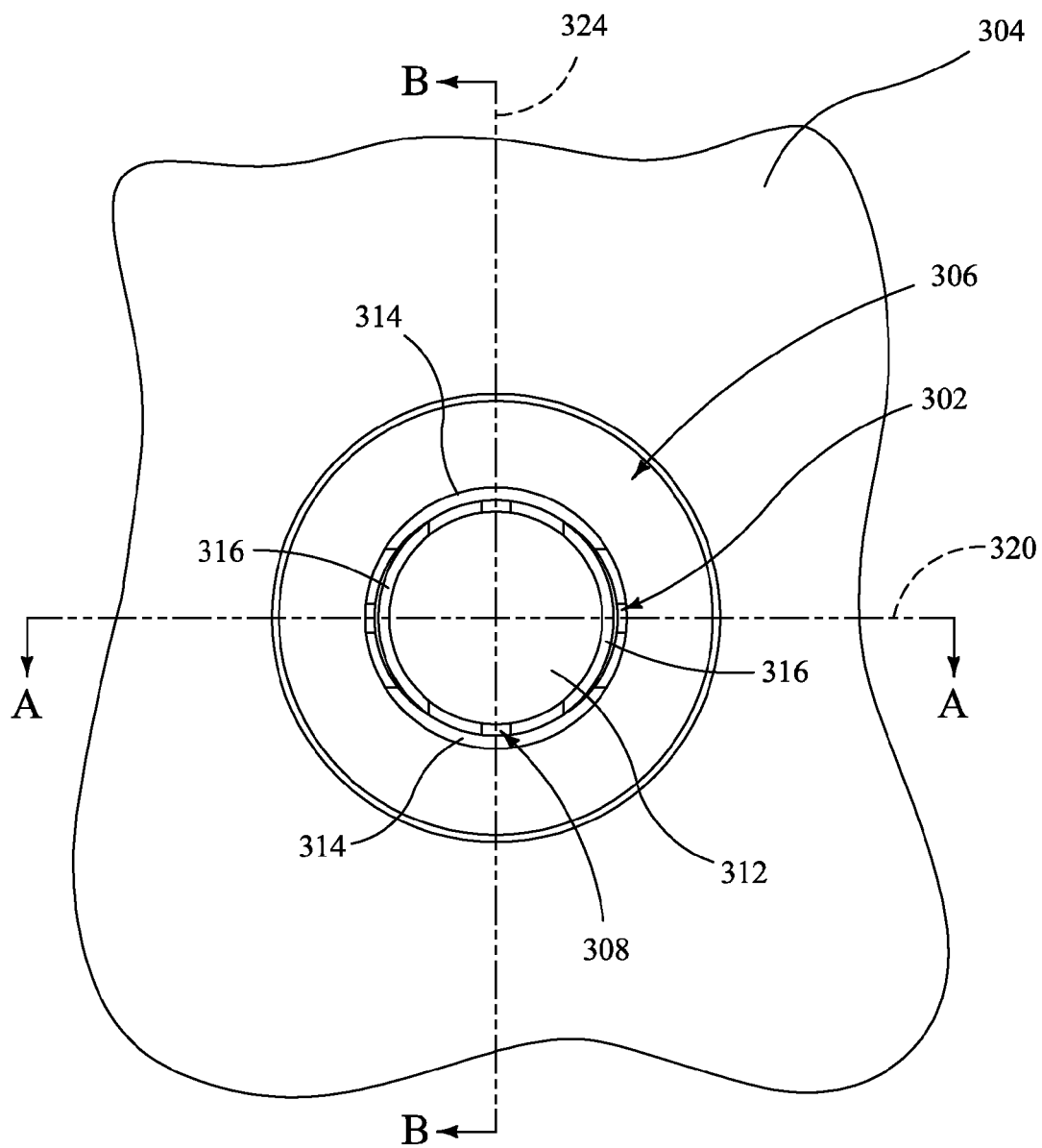
FIG. 3 is a front elevation view of an articulating infrared window including a double gimbal according to some embodiments.

In some embodiments, the window housing includes a double gimbal articulation mechanism as shown in the top plan view of FIG. 3. The double gimbal can include a first gimbal 302 pivotally coupled to the panel 304. In this case, first gimbal 302 is pivotally coupled to a gimbal housing 306 which is in turn, installed within the panel 304. A second gimbal 308 can be pivotally coupled within an aperture of the first gimbal 302. The IR transparent pane 312 can be mounted within an aperture of the second gimbal 308. In such an arrangement, pivoting of the first and/or second gimbals 302, 308 provides for articulation of the IR transparent pane 312 relative to the panel 304. To maintain the seal of the cabinet when the pane 312 is articulated, both the first and second gimbals 302, 308 can include partial spherical extensions 314, 316.

The first gimbal 302 may be generally round and pivotable about a first axis 320. The second gimbal 308 may likewise be generally round and pivotable about a second axis 324 (in this case, a vertical axis). First gimbal 302 should be sized to be rotatable within the gimbal housing 306 and second gimbal 308 should be sized to be rotatable within the first gimbal 302. By providing for rotation of each gimbal 302, 308 about offset axes 320, 324 (preferably perpendicular axes) the IR pane 312 mounted in the second gimbal 308 can be articulated in any orientation relative to the panel 304.

Figure 3A:
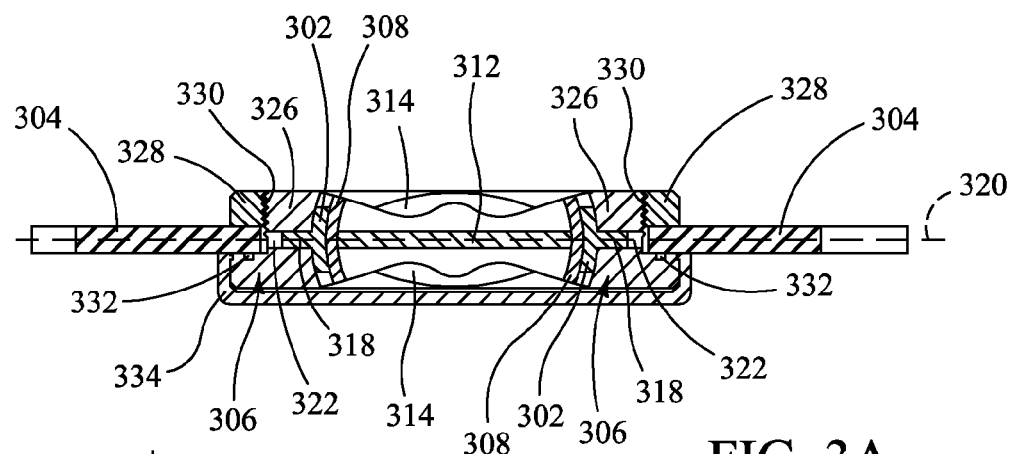
FIG. 3A is a side-sectional view of the embodiment of FIG. 3 from the perspective of broken line A.

FIG. 3A, shows a side sectional view from the perspective of broken line A, to detail the components along first axis 320. From this view, the first gimbal 302 can be seen to include pivot shafts 318 which are received by bearing holes 322 within the outer housing piece 326 of window housing 306. Rotation of pivot shafts 318 within the bearing holes 322 thereby allows pane 312 to articulate about first axis 320.

In addition, FIG. 3A shows how an articulating IR window can be secured within a panel 304. Here, inner housing piece 328 and outer housing piece 326 are threaded with corresponding threads 330, allowing for a bolt-like connection about the panel 304. In some embodiments an o-ring 332 may be installed between the panel 304 and the window housing to further improve the connection. Also present in FIG. 3A is cover 334. Cover 334 may comprise a solid cap sized to fit around the window housing 306. In some embodiments, the cover 334 can be secured to the window housing 306 by snapping into a groove around an edge of the housing.

Figure 3B:
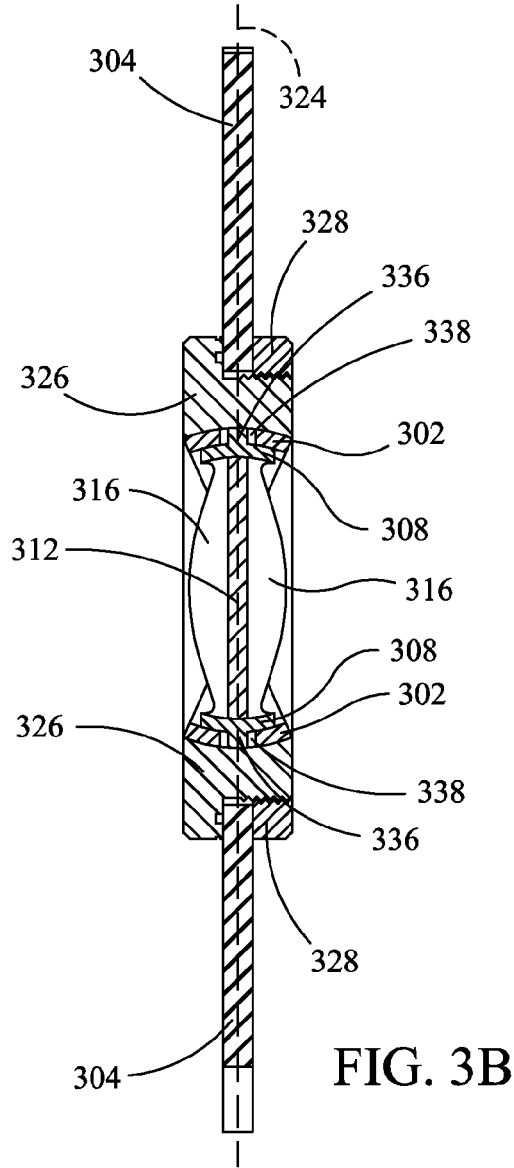
FIG. 3B is a side-sectional view of the embodiment of FIG. 3 from the perspective of broken line B.

FIG. 3B, shows a side sectional view from the perspective of broken line B. This view provides a section view of the articulating window along second axis 324. Accordingly, it can be seen, that to provide for pivoting of the pane about second axis 324, the second gimbal 308 includes pivot shafts 336 which are received by bearing holes 338 within the first gimbal 302.

Figure 4:
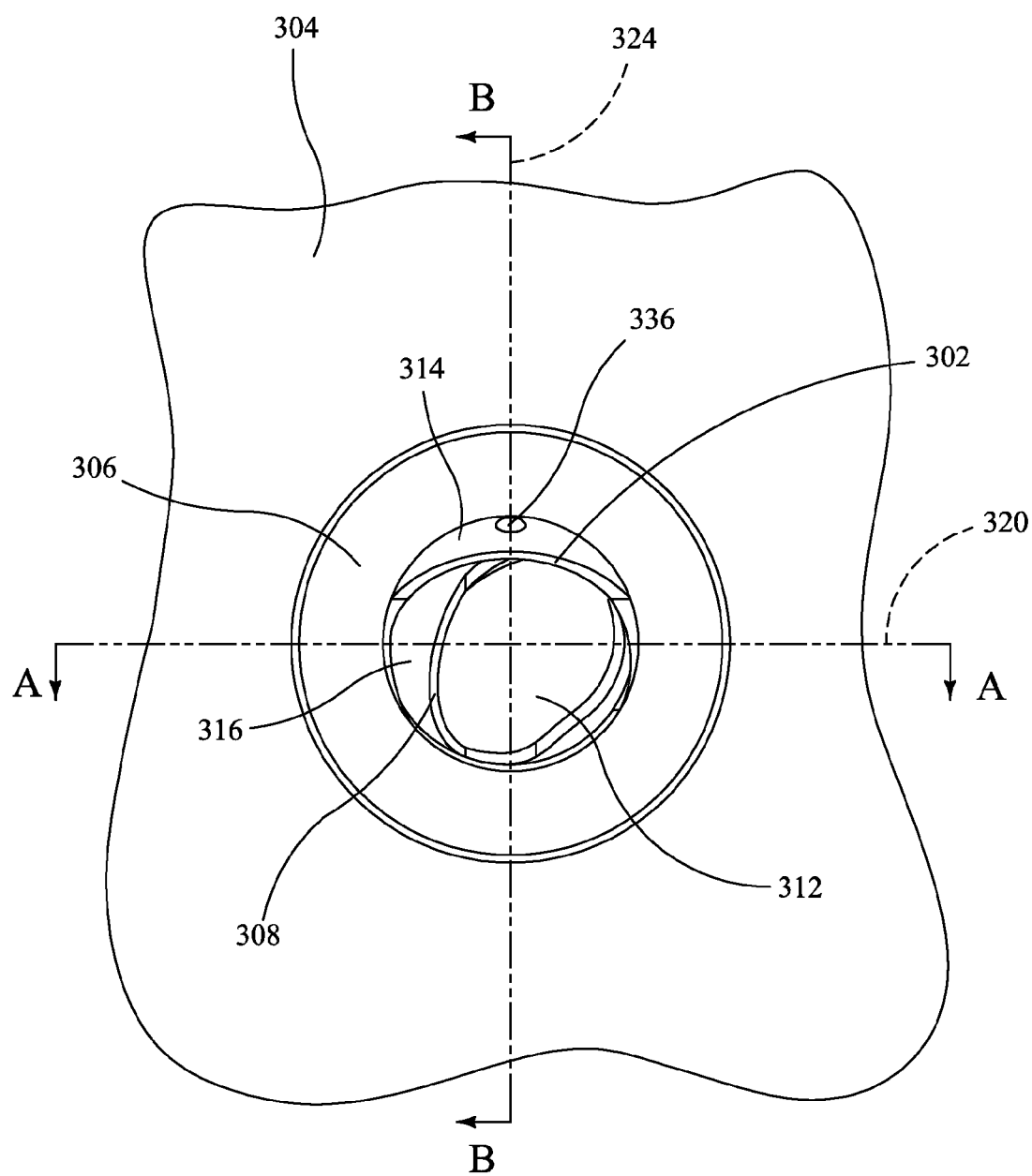
FIG. 4 is a front elevation view of an articulating infrared window including a double gimbal according to some embodiments, the first and second gimbals having been rotated about the first and second axes.

FIG. 4 shows an embodiment including a double gimbal having been articulated about both the first and second axes 320, 324 simultaneously. In this view, the first gimbal 302 has been deflected relative to the gimbal housing 306 and panel 304. In addition, the second gimbal 308 has been deflected relative to the first gimbal 302. From this view, it is apparent that an optical axis perpendicular to the pane 312 can simultaneously be deflected both horizontally and vertically, allowing a user to view components in, for example, the upper, left quadrant of the enclosure. Moreover, this view illustrates the operation of partial spherical extensions 314, 316 located on the gimbals. As pane 312 is articulated within gimbal housing 306 about first and second axes 320, 324, the partial spherical extensions prevent openings between the gimbals from being revealed and thereby maintain the seal of the enclosure.

Figure 4A:
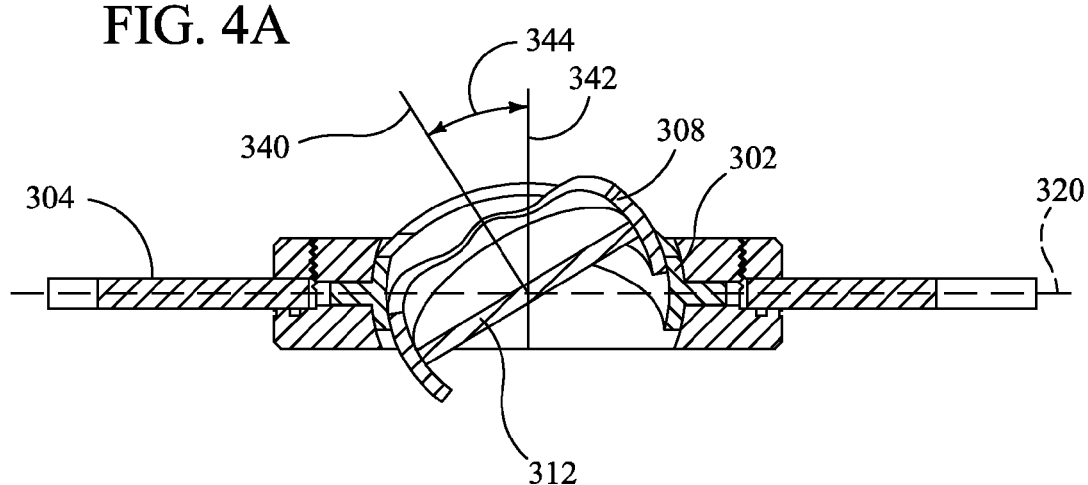
FIG. 4A is a side-sectional view of the embodiment of FIG. 4 from the perspective of broken line A.
Figure 4B:
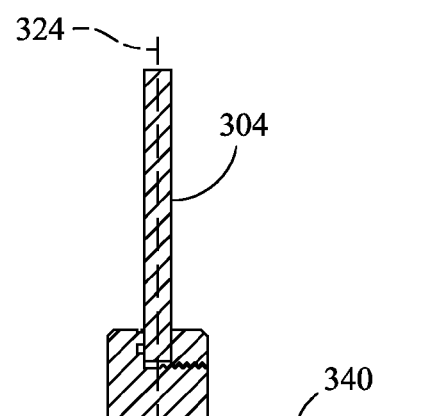
FIG. 4B is a side-sectional view of the embodiment of FIG. 4 from the perspective of broken line B.

FIGS. 4A and 4B, show sectional views of the embodiment of FIG. 4 taken along broken lines A and B respectively. These figures demonstrate the degree of articulatability of an articulating window including a double gimbal. In FIG. 4A, the horizontal articulatability of the pane 312 is demonstrated. Here, optical axis 340 can be seen to be angled relative to centerline 342 by an angle 344. In some embodiments, this angle 344 can be ±30 degrees or more. The vertical articulatability of the same pane 312 is demonstrated in FIG. 4B. In some embodiments, the vertical viewing angle 346 can be ±30 degrees or more. In general, the degree of articulatability can depend upon the dimensions of each gimbal, the dimensions of partial spherical extensions of each gimbal, the spacing between the gimbals, the type of pivot joints used, and other considerations. In some embodiments, a double gimbal can provide a standard IR camera having an approximately 24 degree vertical field of view with about an 84 degree vertical field of view within the cabinet. Likewise, a camera having an approximately 24 degree horizontal field of view can be provided about an 84 degree horizontal field of view within the cabinet.

Figure 12:
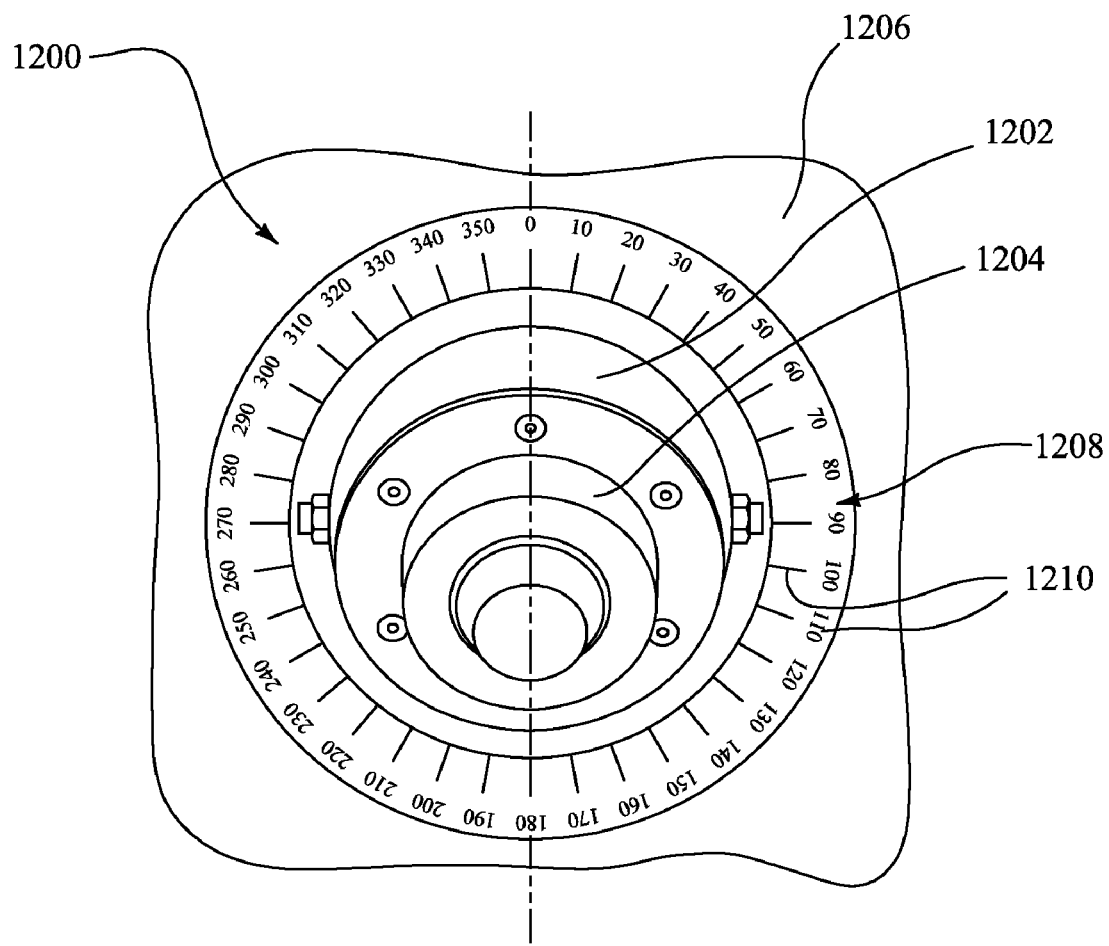
FIG. 12 is a perspective view of an articulating IR window including reference marks.

Embodiments of the invention can father include features that help the user determine the viewing angle and pane position so that a particular image can be repeatably obtained or a particular component within the cabinet can be selectively viewed. For example, some embodiments include reference marks along the outer surface of one or both gimbals. By actuating the gimbals to a specified position, the user to capture a thermal image from a specified angle relative to the panel. Thus, the user need not guess when attempting to view a scene at an angle previously viewed, and a standard of comparison can be established for evaluating scene data. Another example can be seen in FIG. 12. Here, an embodiment of an articulating IR window 1200 having a window housing that includes a gimbal 1202 and a rotary stage 1204 has been installed within a panel 1206. A reference feature 1208 comprising an annular plate including numbered radial markings 1210 has been installed about the window housing. The markings 1210, as shown here, can be dispersed at any regular interval about the reference feature 1208, or alternatively can include any desired number of markings at specific, irregular locations. Other reference features can be installed or added to window components depending upon the design of the window, and each window can include multiple reference features as required to appropriately position the pane.

It should be noted that while the embodiments shown in FIGS. 3-4B show a generally circular double gimbal, the double gimbal can include gimbals that are, for example, generally square, or otherwise shaped.

The IR transparent pane can comprise a variety of materials. In some embodiments, the pane can be made from, for example, IR transmissive glass, crystal, polymer, or other IR transmissive materials. In order to achieve a desired National Electrical Manufacturers Association (NEMA) rating, certain crystals or other materials may be used, for example Germanium, Calcium Fluoride, Barium Fluoride, or other crystals. In addition, panes may include various coatings such as anti-reflective, self-cleaning, strengthening (e.g. hard carbon) or other coatings. Moreover, some panes can include a support mesh. A support mesh can reinforce the pane to meet NEMA standards or otherwise strengthen the pane. Such a mesh can be installed within the pane material, or over one or both surfaces of the material. Meshes can be made from metal, plastic, carbon fiber, or other materials and can be patterned in a honeycomb, diamond, or otherwise shaped grid. For example, the articulating IR window depicted in FIG. 1 includes an IR transparent pane 104 having a diamond-shaped mesh 112.

While thicker pane material and the use of a mesh can reinforce the IR transparent pane making it more rugged, they can also reduce the IR transparency of the pane. In any event, an IR camera viewing objects through an IR transparent pane should be oriented such that the camera's optical axis is perpendicular to the pane. This orientation minimizes the diameter size of the pane and maximizes the IR transmission through the pane. Viewing components through a pane at an angle other than perpendicular to the pane reduces the IR transmission by: 1) increasing IR energy absorption by increasing the path length through the pane material, 2) increasing reflection losses at the material-air interfaces, 3) increasing the occlusion of the reinforcing mesh and 4) possibly reducing the aperture opening. To further reduce the interference of a mesh within the pane, it may be desirable to position the camera lens as close to the pane as possible.

Figure 5:
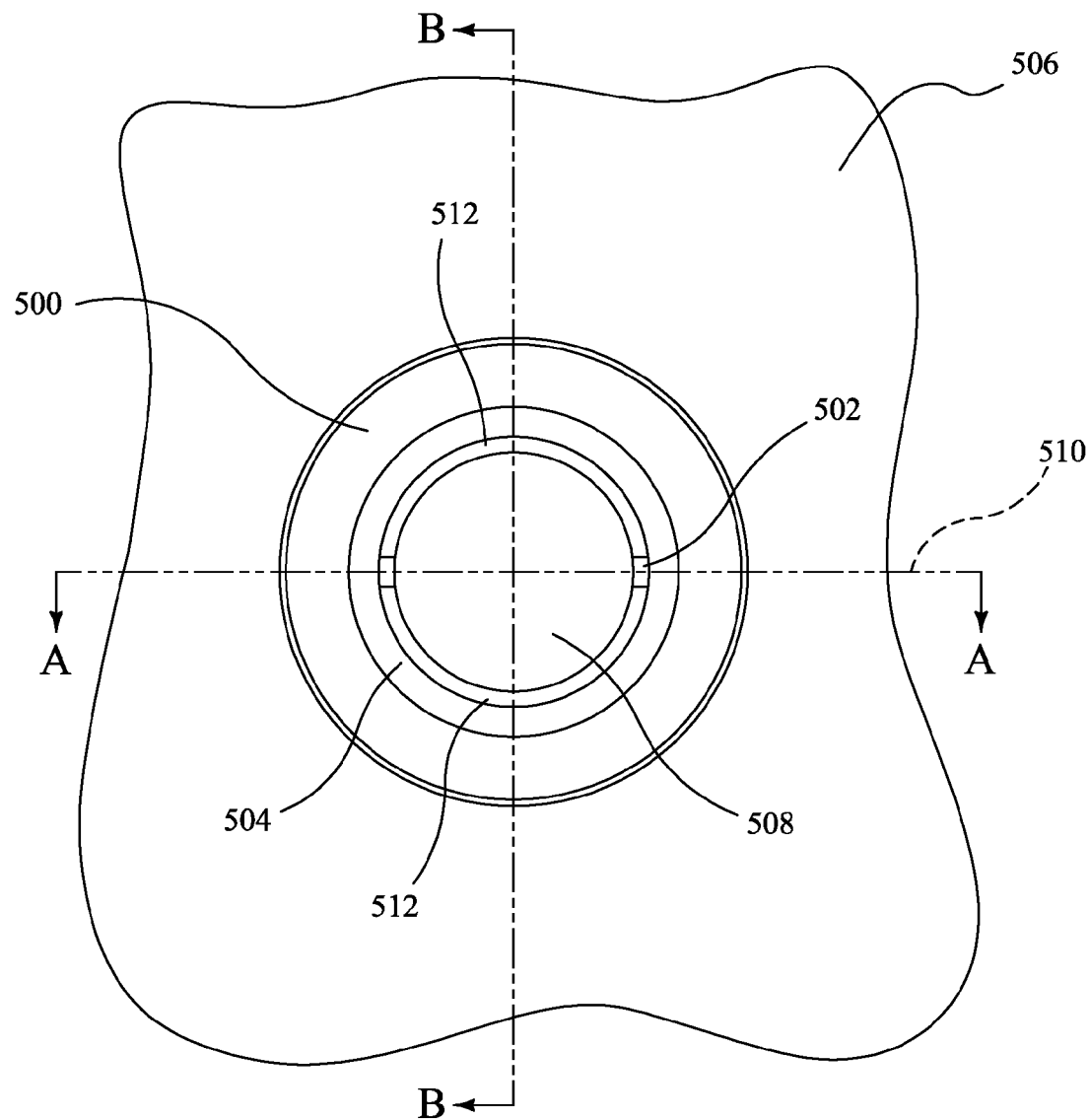
FIG. 5 is a front elevation view of an articulating infrared window including a single gimbal and rotary stage according to some embodiments.

FIG. 5 shows another embodiment of an articulating IR transparent window according to the invention. In this embodiment, the window housing 500 includes a single gimbal 502 and rotary stage 504. Gimbal 502 is pivotally coupled to the rotary stage 504 and the rotary stage 504 is coupled to the window housing 500. As above, the window housing 500 is attached to the panel 506 about a panel opening. The IR transparent pane 508 can be mounted within the aperture of the gimbal 502. In such an arrangement, pivoting the gimbal 502 can cause articulation of the IR pane 508 about an axis 510. The orientation of the axis 510 can be changed by rotating the rotary stage 504 in a plane generally parallel to the panel 506. In some embodiments, the rotary stage 504 can be configured to allow for rotation of 90 degrees or more. In addition, because it may be difficult to engage the rotary stage, some embodiments including further include handle. The handle can attach to the front or a side of the rotary stage 504, and should be accessible to a user to facilitate the rotation of the rotary stage 504. Moreover, some embodiments include reference marks along an outer circumference of the rotary stage 504. Such marks can be use, in conjunction with reference marks on the gimbal, to provide for repeatable imaging of the interior of the cabinet, as described above. To maintain the seal of the cabinet when the pane 508 is articulated, in some embodiments gimbal 502 includes partial spherical extensions 512 such as those discussed above.

FIGS. 5A and 5B show sectional views of the embodiment of FIG. 5 from the perspectives of broken lines A and B, respectively. FIG. 5C provides a detail of area C identified in FIG. 5A. In some embodiments, the window housing 500 includes an outer housing piece 514 and an inner housing piece 516. Such an arrangement may be useful for coupling the window housing to the panel 506, for example, with a threaded connection 518 as discussed above. In the embodiments of FIGS. 5A-5C, outer housing piece 514 includes a groove 520, for receiving the rotary stage 504. As is apparent from the multiple views, in some embodiments, the groove 520 can extend around the inner circumference of the outer housing piece 514, thereby allowing for free, and complete rotation of the rotary stage 504 within the housing. In other embodiments, this may not be the case, as the rotary stage may be limited to rotating through a segment of an arc, for example, a 90 degree limit of rotation. Along one axis 510, rotary stage 504 includes bearing holes 522 for receiving pivot shafts 524 of the gimbal 502. Such an arrangement can allow for rotation of the gimbal 502, and thereby articulation of the pane 508, about the axis 510.

Figure 6:
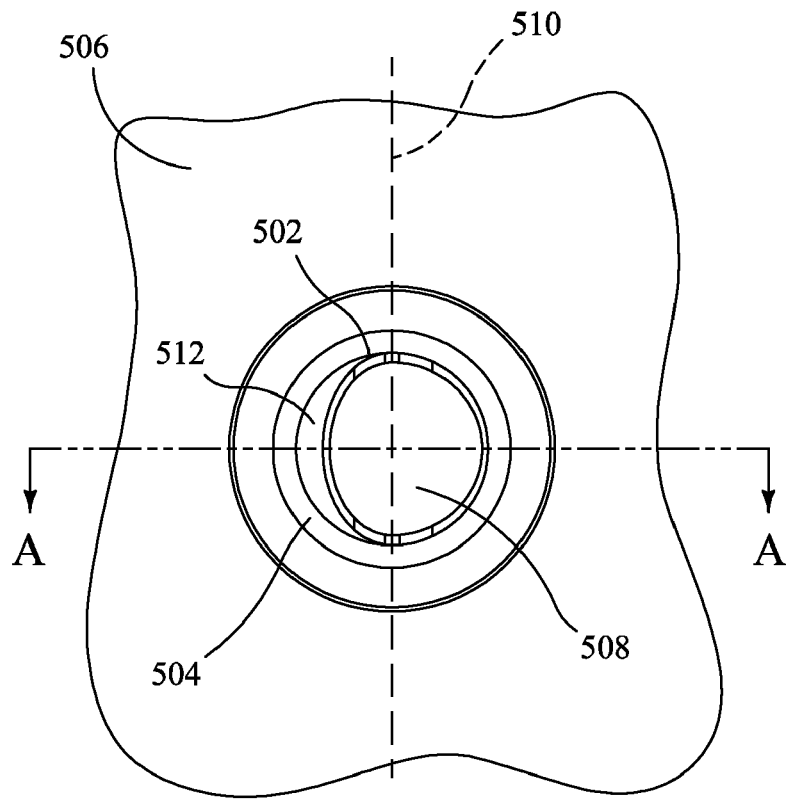
FIG. 6 is a front elevation view of an articulating infrared window including a single gimbal and rotary stage according to some embodiments, the rotary stage having been rotated and the gimbal having been pivoted about the gimbal axis.
Figure 6A:
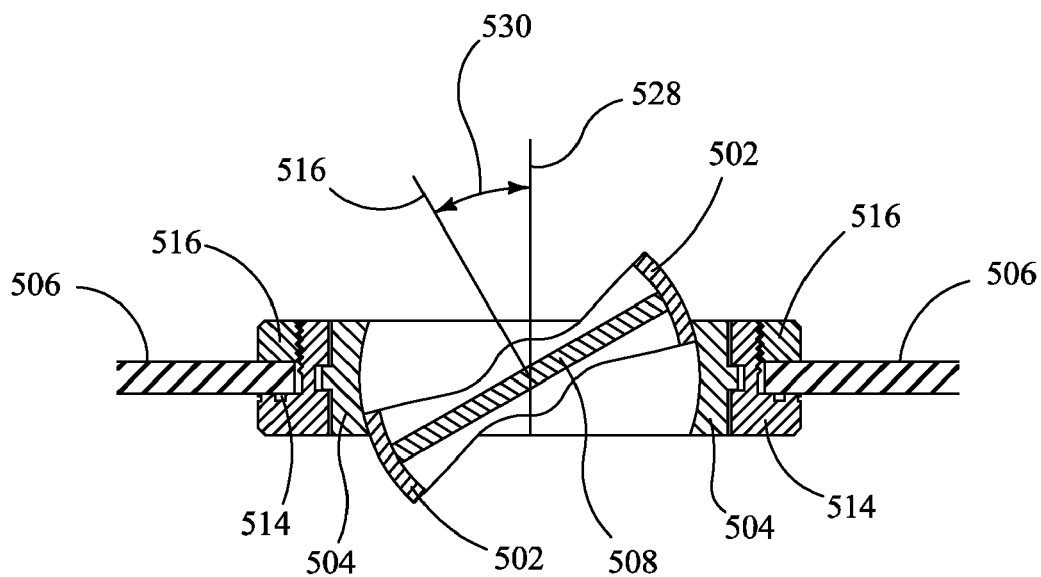
FIG. 6A is a side-sectional view of the embodiment of FIG. 6 from the perspective of broken line A.

FIG. 6 shows a plan view of an embodiment including a single gimbal and rotary having been articulated. In this view, the rotary stage 504 has been rotated such that gimbal pivot axis 510 is oriented vertically. Such an orientation allows for the pane 508 to articulate horizontally relative to the panel 504 by tilting the gimbal 502. Here, the right edge of the gimbal has been tilted inward, allowing a user to view the left side of the interior of the cabinet. Additionally, from this view, it can be seen that partial spherical extensions 512 have maintained the seal of the cabinet. FIG. 6A shows a sectional view of the embodiment of FIG. 6 taken along broken line A. Notice that because rotary stage 504 has been rotated, the gimbal pivot shaft and rotary stage bearing hole are no longer visible in this section. This figure demonstrates the degree of articulatability of an articulating window including a single gimbal and rotary stage. Here, optical axis 526 can be seen to be angled relative to centerline 528 by an angle 530. In some embodiments, this angle 530 can be ±30 degrees or more. Further, one can appreciate that by repositioning the rotary stage 504 in different angular orientations, articulation of the gimbal can provide for vertical articulatability of the pane 508, or a combination of vertical and horizontal articulatability.

In some embodiments, the transparent IR pane is made articulatable by the inclusion of a ball-and-socket joint in the window housing. In FIG. 7A, such an articulating IR window 700 is shown installed within a panel opening in a panel 702 of an enclosure. In such an embodiment, articulating IR window 700 includes a socket frame 710 coupled to the panel 702 about the panel opening and a generally spherical segment housing 712 disposed within the socket frame 710. Spherical segment housing 712 can include a window receiving opening 714 and an interior segment opening 716 to define an aperture through a hollow portion 718 of the segment. The aperture can be sealed at the window receiving opening 714 by an IR transparent pane 720 thereby completely enclosing the cabinet.

Socket frame 710 can include a generally circular frame adapted to be installed within a panel 702 and to receive spherical segment housing 712. The socket frame 710 can define a frame aperture to the interior 722 of the enclosure. Socket frame 710 can include rim portions 724 adapted to frictionally engage and retain the spherical segment housing 712 within the frame aperture. In addition, the socket frame 710 can include a panel flange 726 for engaging the panel 702 and securing the articulating window 700 thereto. In some embodiments, the panel flange 726 may include apertures 728 through which a screw, rivet, bolt, or other connecting means can be installed to secure the socket frame 710 to the panel 702. Some embodiments include an o-ring groove 730 running along an interior circumference of the socket frame 710. The o-ring groove 730 may house an o-ring 732 to seal and centrally locate the spherical segment housing 712 within the socket frame 710.

The spherical segment housing 712 can be a generally hollow spherical segment frictionally engaged by the socket frame 710. A segment diameter 734 provides for the segment housing 712 to be substantially coextensive with the frame aperture while allowing for rotation of the housing within the socket frame 710. In the embodiment shown in FIG. 7A, spherical segment housing 712 includes a window-receiving opening 714 residing in a first plane 736 bisecting one end of the housing. The spherical segment 712 further includes an interior segment opening 716 in an opposite end of the housing in a second plane 738 substantially parallel to the first plane 736.

In many embodiments, window-receiving opening 714 can be smaller than interior segment opening 716 to facilitate the angular field of view of the IR camera. Such an arrangement can provide an improved field of view for a camera viewing the cabinet interior 722 through IR transparent pane 720. For example, in one embodiment, window-receiving opening can be approximately two inches in diameter and interior segment opening can be approximately three inches in diameter. However, it should be understood that in other embodiments the relative sizes of the window-receiving opening and the interior segment opening may vary. For example, the openings could be of the same diameter.

Further, some embodiments include a rotation limiter 740. The rotation limiter 740 can be a lip, ridge, or other device to stop the spherical segment housing 712 from over-rotating. For example, as in FIG. 7A, the spherical segment housing 712 can include a lip 740 about the window-receiving opening 714. In some embodiments, such a lip 740 can be formed of the same material and by the same process as the spherical segment housing 712 itself. Alternatively, a rotation limiter may be a separate component installed on the segment housing 712 or socket frame 710. Moreover, a rotation limiter need not be installed about the window receiving opening 714. For example a rotation limiter can include a lip about the interior segment opening 716.

In addition, some embodiments include reference marks on the socket frame 710, spherical segment housing 712, or both. Such marks can be used, as described above, to ensure repeatable frame locations and therefore consistent thermographic analysis.

Embodiments of the articulating IR window include an IR transparent pane 720 disposed within the spherical segment housing 712. For reasons discussed below, it may be desirable to position the pane such that a camera utilizing the articulating IR window can be close to the pane with the camera's optical axis being perpendicular to the pane. To this end, in many embodiments the pane can be disposed within the window-receiving opening 714. However, in other embodiments an IR transparent pane can be disposed at any point and at any angle with respect to the first plane 736. For example a pane can be installed to span the interior segment opening 716.

Suitable IR transparent panes 720 for use with a window housing including a ball-and-socket joint include all panes and variations thereon discussed above.

Figure 7B:
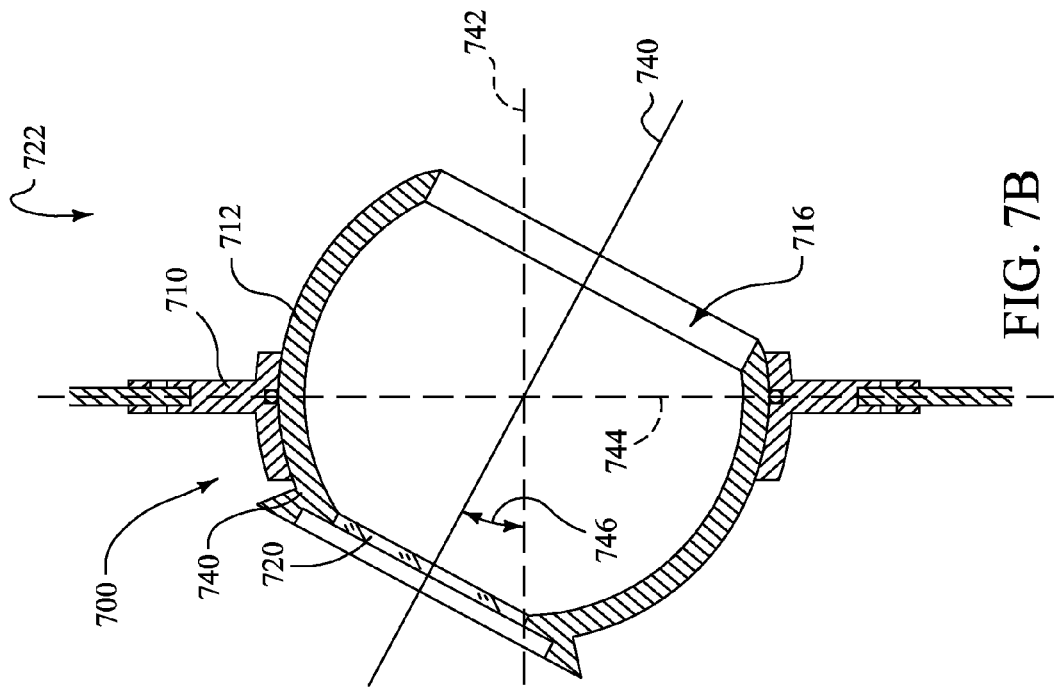
FIG. 7B is a side-sectional view of the articulating IR window of FIG. 2A wherein the pane has been articulated up from center.
Figure 7A:
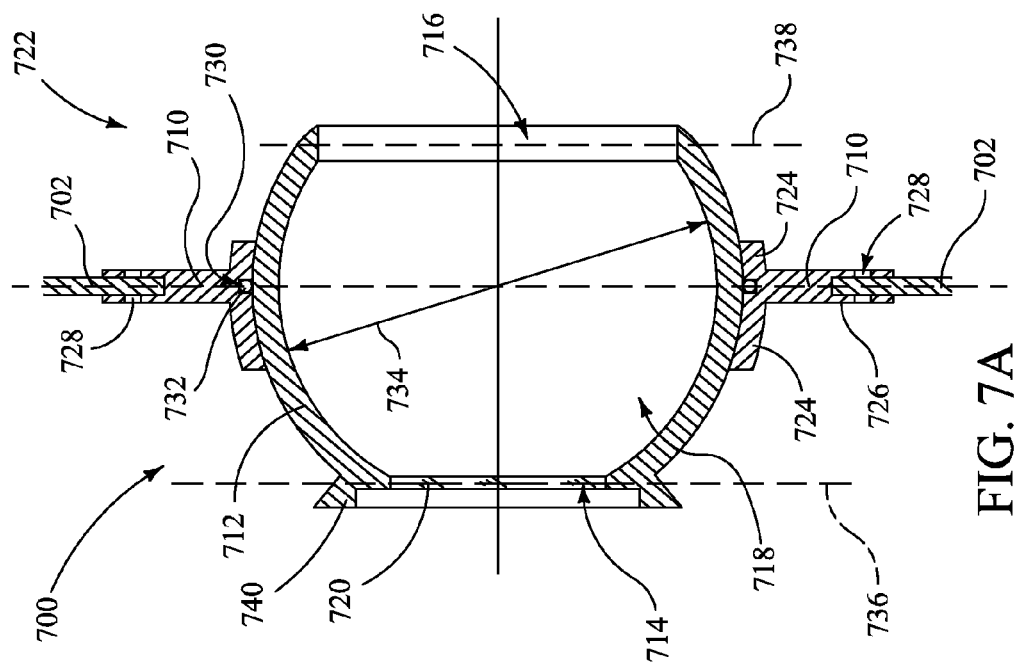
FIG. 7A is a side-sectional view of an embodiment of an articulating IR window including a ball-and-socket joint installed within a panel.

FIG. 7B shows the articulating IR window 700 of FIG. 7A, wherein the spherical segment housing 712 has been rotated up from center. In this orientation, optical axis 740 is deviated from centerline 742 (representing an axis perpendicular to panel plane 744) by a viewing angle 746. Despite the change in viewing angle, the optical axis 740 remains generally perpendicular to the IR transparent pane 720.

FIG. 7B also depicts the operation of a rotation limiter 740. Here, spherical segment housing 712 has been articulated until lip 740 abuts the socket frame 710. In this manner, the socket frame 710 and lip 740 restrict the articulation of the spherical segment 712 to prevent over rotation. Over rotation could result if spherical segment housing 712 is allowed to rotate to a degree where the interior segment opening 716 overlaps the socket frame 710. Over rotation could create an opening to the interior of the enclosure 722 or even cause the spherical segment housing 712 to disengage from the socket frame 710.

FIGS. 8A and 8B present a side sectional view of an enclosure 800 having an embodiment of an articulating IR window 802 installed in a panel 804 thereof and demonstrate the articulatability of the window. The articulating IR window 802 depicted includes a ball-and-socket window housing 806, such as, for example, one of those discussed above, and an articulatable IR transparent pane 808.

In FIG. 8A, the IR window pane 808 has been articulated down from center line 810. Such articulation causes the optical axis 812 of a camera 814 positioned perpendicular to the pane 808 to be angled generally upward at angle 816. Thus, components in the top of the cabinet 818 are within the field of view 820 of the camera 814. Contrariwise, in FIG. 8B the IR window pane 808 has been articulated up from center line 810. This articulation causes the optical axis 812 of camera 814 to be angled generally downward at angle 822, while remaining generally perpendicular to the pane 808. In such an arrangement, components in the bottom of the cabinet 824 are now within the camera's field of view 820. In some embodiments, pane 808 can be articulated ±30 degrees or more from centerline 810. Combining the window articulation of ±30 degrees with a standard camera field of view of approximately 24 degrees results in a total field of view of approximately 84 degrees. And equally important is that at any point in the total 84 degree field of view, the spatial resolution is equal to that of the 24 degree field of view of a standard camera.

From FIGS. 8A and 8B and the discussion above, it is apparent that embodiments of the articulating IR window 802, can increase the total camera field of view within the cabinet while maintaining a camera perpendicular to the pane 808. Moreover, while FIGS. 8A and 8B depict a two-dimensional view showing only the vertical visible field, one should appreciate that such articulations and exemplary ranges are capable in the horizontal direction with the same device. Therefore, some embodiments can provide a camera having an approximately 24 degree horizontal field of view with about an 84 degree horizontal field of view within the cabinet. Moreover, it should be recognized that embodiments of the invention are articulatable about a plurality of axes. For example, a pane can be articulated downward (vertically) and to the right (horizontally), to provide a field of view in the upper left of the cabinet.

Figure 9:
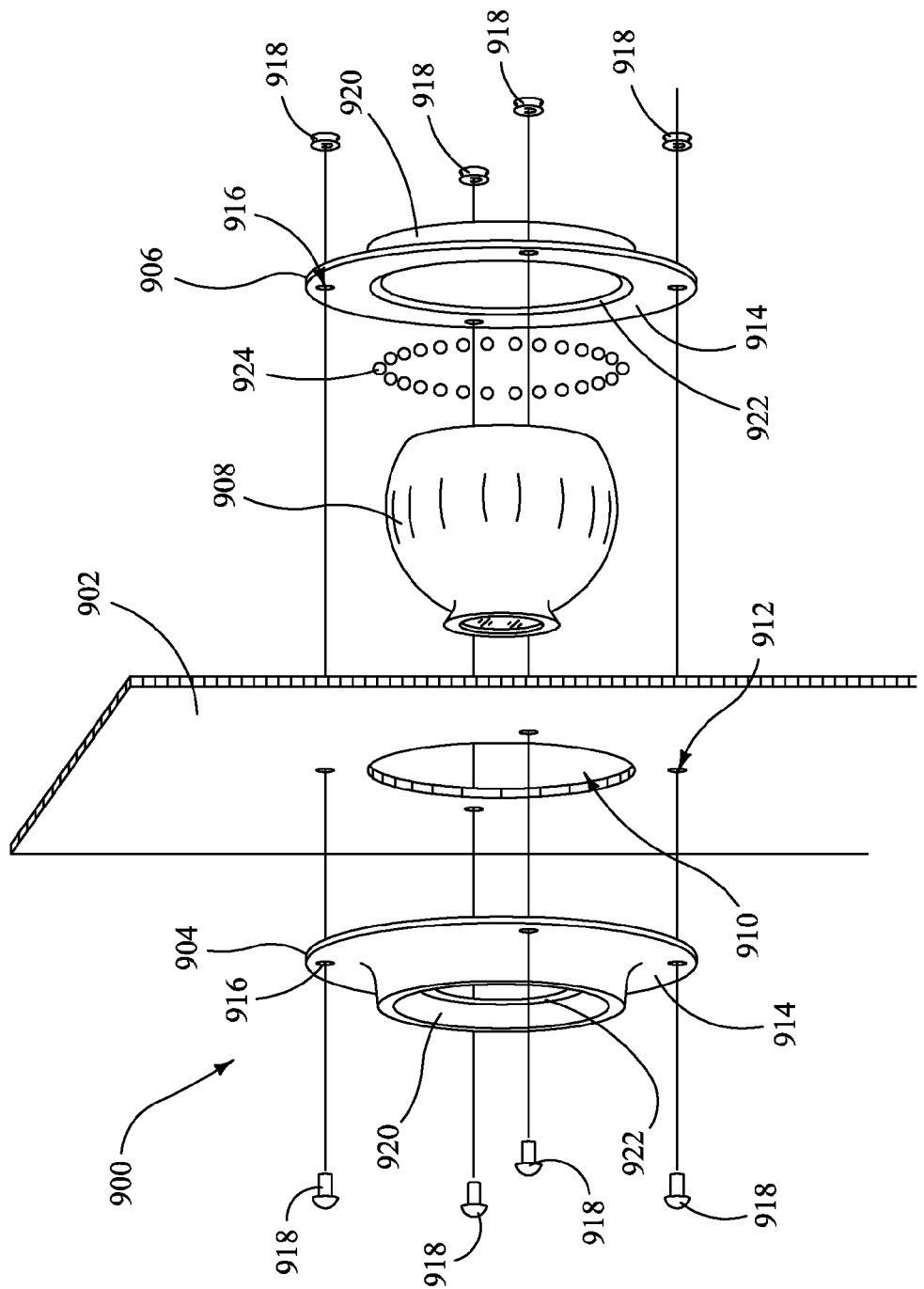
FIG. 9 is an exploded side view of an embodiment of an articulating IR window including a ball-and-socket joint according to some embodiments of the invention.

FIG. 9 shows an exploded view of an embodiment of an articulating IR window 900 including a ball-and-socket joint to depict how such an embodiment may be installed within a panel 902. From this view, it can be seen that in some embodiments, the socket frame can include an exterior portion 904 and an interior portion 906 which, when installed, sandwich the panel 902 and spherical segment housing 908. Panel 902 includes panel opening 910 about which a plurality of connection apertures 912 have been drilled. Exterior and interior frame portions 904, 906 can include panel flange 914 for coupling the socket frame to the panel 902. In some embodiments, panel flange 914 can include connection apertures 916 for receiving a connector 918 (for example screws, rivets, bolts). Exterior and interior frame portions 904, 906 further include a segment receiving portion 920 adapted to frictionally retain the spherical segment housing 908 within the socket frame while still allowing for rotation of the spherical segment housing 908 within the socket frame. In some embodiments, interior, exterior, or both frame portions 904, 906 include a groove 922 adapted to receive ball bearings 924.

In other embodiments of the articulating IR window, the window housing includes an expansion joint. For example, the embodiment of FIG. 10A depicts such an articulating window 1000 coupled to a panel 1002 about a panel opening 1004. In this example, the expansion joint of the window housing is a bellows 1006. Bellows 1006 can include a tubular sleeve 1008 adapted to be coupled to the panel 1002 such that an interior opening 1010 at one end of the sleeve 1012 is coextensive with the panel opening 1004. An exterior opening 1014 at the opposite end of the sleeve 1016 can be adapted to receive an IR transparent pane 1018. Sleeve 1008 can be flexible, so that the exterior opening 1014 can articulate relative to the interior opening 1010.

In many embodiments including a bellows, the sleeve 1008 can include a plurality of pleats 1020 having a pleat width 1022. The pleats 1020 can be expanded or contracted to alter the length of all or a portion of the sleeve 1008. In this manner, the exterior end of the sleeve 1016 can be articulated relative to the interior end of the sleeve 1012. For example, in FIG. 10B the pleats on the bottom portion of sleeve 1024 have been expanded, causing this portion of the sleeve to extend. At the same time, the pleats on the top portion of the sleeve 1026 have been contracted, shortening that portion of the sleeve.

FIG. 10B illustrates the articulatability of a window 1000 including a bellows or other expansion joint. In this example, IR transparent pane 1018 has been articulated relative to the panel plane 1026 by extending one portion of the sleeve and contracting another portion. In this manner, the optical axis 1028 of a camera 1030 arranged perpendicular to the pane 1018 provides a view of the interior of the enclosure at a viewing angle 1032 relative to the center line 1036. Specifically, in this view, the bottom portion of the sleeve 1024 has been extended and the top portion of the sleeve 1025 has been contracted to provide a vertical viewing angle 1032 down relative to center line 1034. Similarly, one can appreciate that other portions of the sleeve could be extended and/or contracted to provide other viewing angles. For example, a horizontal viewing angle can be accomplished by extending or contracting the left and right sides of the sleeve. Moreover, the IR transparent pane can be simultaneously articulated horizontally and vertically by, for example, contracting the bottom, left portion and extending the top, right portion of the sleeve.

The degree of articulatability of an articulating window including a bellows can depend upon the flexibility of the sleeve material, the number of pleats, the pleat width, and other considerations. In some embodiments, a bellows can provide a camera having an approximately 24 degree vertical field of view with about an 84 degree vertical field of view within the cabinet. Likewise, a camera having an approximately 24 degree horizontal field of view can be provided about an 84 degree horizontal field of view within the cabinet.

The embodiments shown in FIGS. 10A and 10B depict a sleeve having a generally constant cross-sectional diameter 1036. In such embodiments, the cross-sectional diameter may be approximately two inches. Some embodiments, such as that shown in FIG. 10C, may include a tapered sleeve 1008. For example, the interior end of the sleeve 1012 can be larger in diameter than the exterior end of the sleeve 1016. In one such embodiment the interior end of the sleeve 1012 can be approximately three inches in diameter and the exterior end of the sleeve 1016 may be approximately two inches in diameter. Moreover, embodiments including a bellows can include a bellows of a variety of cross-sectional shapes. For example, the bellows could be circular (as in FIG. 10C), square, triangular, or any other suitable cross-sectional shape.

Referring back to FIGS. 10A and 10B, sleeve 1008 can be coupled to the panel 1002 and IR transparent pane 1018 by various mechanisms. In some embodiments, a portion of the sleeve 1038 can be frictionally disposed between a panel attachment flange 1040 and the panel 1002 about the panel opening 1004. The panel attachment flange 1040 can be coupled to the panel 1002 on the interior of the cabinet (as in FIG. 10A) or on the exterior of the cabinet (as in FIG. 10B). Screws, bolts, rivets, or other attachment mechanisms can be used to couple the panel attachment flange 1040 to the panel 1002. One having ordinary skill in the art can appreciate many other ways in which a bellows can be attached about panel opening 1004.

Similarly, many arrangements can be used to couple the IR transparent pane 1018 to the sleeve. In one embodiment, a portion of the sleeve 1042 can be coupled within a sleeve receiving portion 1044 of a pane attachment flange 1046. The pane attachment flange 1046 can include a shoulder for receiving the IR transparent pane 1018. Any number and variety of mechanisms can be used to secure the pane 1018 and sleeve 1008 to the pane attachment flange 1046, for example adhesives, screws, bolts, rivets, welds, or other attachment mechanisms.

Suitable IR transparent panes 1018 for use with a window housing including a bellows include all panes and variations thereon discussed above.

A bellows 1006 such as that of FIGS. 10A, 10B, and 10C can include a sleeve 1008 made from a variety of materials, for example, most likely metal but also elastomer coated fabrics, neoprene, nylon, Kevlar, and other materials. Panel and pane attachment flanges 1040, 1046 can be constructed of any suitable material such as metal, plastic, or other materials. Such a bellows may be capable of providing a complete seal against air and dust while providing for transmission of IR radiation through the pane. Moreover, some articulating windows including bellows can maintain the NEMA safety rating of the enclosure.

Figures 11A, 11B:
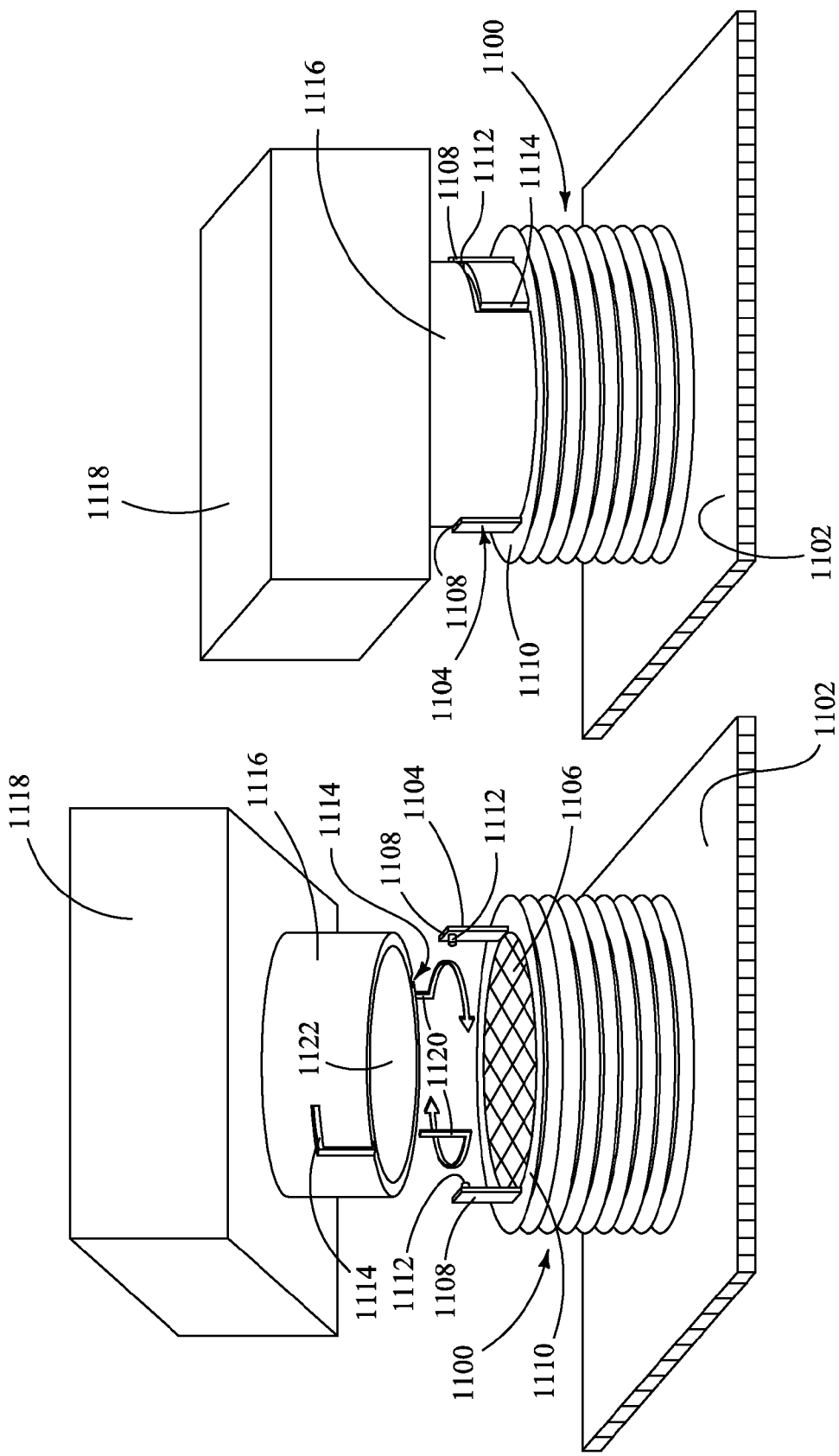
FIG. 11A is a perspective view of a cabinet panel having an articulating IR window including a receiving assembly according to some embodiments.
FIG. 11B is a perspective view of a cabinet having an articulating IR window including a receiving assembly with a camera installed thereon according to some embodiments.

In some embodiments, the window housing includes a receiving assembly for detachably mounting an IR camera to the window housing. A receiving assembly can be as simple as two or more pins on the window assembly matching corresponding holes on a camera or lens. Other receiving assemblies may be more complex, for example, FIG. 11A depicts an articulating IR window 1100 installed in a panel 1102 having a receiving assembly 1104 connected about the IR transparent pane 1106. In this embodiment, the receiving assembly 1104 includes two keyed projections 1108 extending from the window housing 1110. The projections 1108 include key portions 1112 which are configured to slide into corresponding grooves 1114, on a lens housing 1116 of an IR camera 1118. Insertion of the grooves 1114 about key portions 1112 and twisting of the camera 1118 (e.g. according to arrows 1120), can securely position the camera 1118 against the pane 1106. FIG. 11B shows an example of the camera 1118 after having been received by the receiving assembly 1104. Once installed, articulation of the camera 1118, can cause articulation of the IR transparent pane 1106 relative to the panel 1102, with the IR transparent pane remaining fixed relative to the camera 1118. In some embodiments, mounting the camera 1118 to the receiving assembly 1104, positions the camera lens 1122 generally parallel to the IR transparent pane 1106. Further, in some embodiments, a lens 1122 of the camera 1118 mounted by a receiving assembly 1104 to the window housing 1110 can be generally coaxial with the IR transparent pane 1106. In such manner, a receiving assembly can help to maintain a camera in a perpendicular orientation, close to the IR transparent pane, even as the pane is articulated. Such an orientation may be desirable for the reasons discussed above.

One having ordinary skill in the art can appreciate many receiving assemblies and variations on the above described receiving assembly may be used to detachably couple a camera or lens thereof to a window housing. For example, the grooves and key portions could be swapped such that the receiving assembly includes a groove to receive a key portion on the lens of a camera. The number of variations, arrangements, or assemblies are too numerous to describe, and accordingly all such receiving assemblies are to be considered within the scope of this specification.

Although FIGS. 11A and 11B show a receiving assembly coupled in conjunction with an embodiment having a bellows, it is contemplated that any of the above described embodiments can be adapted to include the depicted or another receiving assembly. For example in FIG. 3, the spherical extensions 314, 316 of the double gimbal could be shaped to match and receive the camera lens such that the camera lens need only to be pressed against the window frame and as the camera pointing is adjusted, the articulating window follows.

In another aspect, the invention includes a cabinet having an articulating IR window installed in a panel thereof for viewing the interior of the cabinet. One such embodiment can be seen in FIG. 1. In this embodiment, the cabinet 102 includes a plurality of panels 106, 114 enclosing a cabinet interior 110. The panels 106, 114 can be arranged in a generally rectangular-prism shape, each defining a surface of the prism and arranged so as to completely enclose a volume. Panels 106, 144 can be made of metal or other suitable material and can be connected at edges 116 by any suitable means such as welding, mechanical connecting means, or other joints. In some embodiments, one panel is a door, coupled by a hinge along an edge to another panel. An articulating IR window may be installed into a panel that is a door. In the embodiment of FIG. 1, a front panel 106 of the cabinet has an articulating IR window 100 installed about a panel opening therein. The articulating IR window 100 can include an IR transparent pane 104 coupled within a window housing 108. In some embodiments, the window housing 108 can be substantially coextensive with the panel opening, and the IR transparent pane 104 can be substantially coextensive with an aperture in the window housing 108. Moreover, the IR transparent pane 104 is configured to be articulatable relative to the panel 106. In this manner, the articulating IR window can provide an IR camera with a wide angle field of view of the interior of the cabinet 110, while keeping the cabinet 102 completely enclosed.

The embodiment shown in FIG. 1 depicts a cabinet 102 including an articulating IR window 100 having a ball-and-socket joint, as discussed above. However, it should be understood that a cabinet according to this aspect of the invention can include any of the above described articulating IR windows, or any variants thereof. For example, a cabinet according to this aspect of the invention can include an articulating IR window having a bellows, or a double gimbal.

In yet another aspect, the invention includes a method of imaging components on the interior of a cabinet. Embodiments of such a method can include the steps of connecting a camera to an articulating IR window and articulating the camera relative to the panel. In some embodiments, the method can be performed using any of the embodiments of an articulating IR window discussed above. For example, in some embodiments, the method is carried out by attaching a camera to an articulating IR window having a window housing that includes a ball-and-socket joint, such as the embodiment in FIG. 2A.

Moreover, the step of connecting the camera to the articulating window can include connecting the camera in any number of ways. In some embodiments, an articulating IR window including a receiving assembly, such as that of FIGS. 11A and 11B is used. In such embodiments, the method can include the steps needed to couple the camera or lens housing via the particular receiving assembly in use. For example, in a method wherein a receiving assembly such as that of FIG. 11A is used, the connecting step may be accomplished by inserting keyed projections 1112 on the receiving assembly 1108 into grooves 1114 on the lens housing 1116 and twisting the camera 1118 to lock it in place. For embodiments of an articulating window that does not include a receiving assembly, the step of connecting the camera can include simply positioning the camera lens about the IR transparent pane.

The step of articulation of the camera relative to the panel can include twisting, pushing, pulling, or otherwise maneuvering the camera so as to obtain a desired view of objects within the cabinet. In embodiments that include a receiving assembly, the articulation of the camera can be transferred to the pane via the receiving assembly. In this manner, the articulation of the camera relative to the panel thereby causes the IR transparent pane to be articulated relative to the panel. In embodiments not including a receiving assembly, the step of articulation of the camera relative to the panel can include an additional step of articulating the IR transparent pane. For example, a user may need to maneuver the pane with their hand, as the camera is articulated. In any event, embodiments generally provide that a desired angle (e.g. perpendicular) of the optical axis relative to the pane can be maintained for viewing different portions of the interior of the cabinet.

While the invention has been described in conjunction with specific embodiments thereof, it is evident that many alternatives, modifications, combinations, and variations will be apparent to those skilled in the art in light of the foregoing description. Accordingly, it is intended to embrace all such alternatives, modifications, combinations, and variations, which fall within the spirit and broad scope of the invention.

What is claimed is:

1. An articulating infrared window kit for installation into a panel of a cabinet, comprising:
   a window housing adapted to be mounted within the panel, such that the window housing provides an aperture to the interior of the cabinet; and
   an infrared transparent pane adapted to be coupled to the window housing, substantially coextensive with the aperture in the window housing and configured such that the infrared transparent pane provides a line of sight to the interior of the cabinet and is articulatable relative to the panel while allowing the cabinet to remain generally enclosed.

2. The articulating infrared window kit of claim 1, wherein the window housing includes a single gimbal and rotary stage.

3. The articulating infrared window kit of claim 2, wherein the gimbal and rotary stage comprises:
   a rotary stage rotatably coupled to the panel in a plane generally parallel with the panel and substantially coextensive with the aperture in the window housing, the rotary stage being rotatable at least 90 degrees and including a rotary stage opening; and
   a gimbal adapted to be pivotally coupled to the rotary stage and substantially coextensive with the rotary stage opening, the gimbal configured to receive the infrared transparent pane.

4. The articulating infrared window kit of claim 1, further comprising a receiving assembly operably connected to the window housing for detachably mounting an infrared camera to the window housing.

5. The articulating infrared window kit of claim 4, wherein the receiving assembly includes keyed projections for receiving a lens housing of the infrared camera.

6. The articulating infrared window kit of claim 4, wherein an optical axis of a lens of the infrared camera is generally perpendicular to the infrared transparent pane when the infrared camera is mounted to the receiving assembly.

7. The articulating infrared window kit of claim 4, wherein an optical axis of a lens of the infrared camera mounted to the receiving assembly of the window housing is coaxial with a central axis of the infrared transparent pane.

8. The articulating infrared window kit of claim 1, wherein the infrared transparent pane is articulatable about a plurality of axes.

9. The articulating infrared window kit of claim 1, wherein the articulating window allows for about an eighty-four (84) degree horizontal field of view within the cabinet with a camera having about a twenty-four (24) degree field of view.

10. The articulating infrared window kit of claim 1, wherein the articulating window allows for about an eighty-four (84) degree vertical field of view within the cabinet with a camera having about a twenty-four (24) degree field of view.

11. The articulating infrared window kit of claim 1, further comprising a cover adapted to be installed about the infrared transparent pane when not in use.

12. An articulating infrared window kit for installation into a panel of a cabinet, comprising:
   a window housing adapted to be mounted within the panel, such that the window housing provides an aperture to the interior of the cabinet and
   an infrared transparent pane adapted to be coupled to the window housing, substantially coextensive with the aperture in the window housing and configured such that the infrared transparent pane is articulatable relative to the panel while allowing the cabinet to remain generally enclosed, wherein the window housing includes a ball-and-socket joint.

13. The articulating infrared window kit of claim 12, wherein the ball-and-socket joint comprises:
   a spherical segment housing including a window-receiving opening configured to receive the infrared transparent pane and substantially parallel with a segment diameter and an interior segment opening, the segment diameter being intermediate the window-receiving opening and the interior segment opening, and substantially coextensive with the aperture; and
- a socket frame adapted to be coupled to the panel and configured to receive the spherical segment housing and allow for articulation of the spherical segment within the socket frame.

14. An articulating infrared window kit for installation into a panel of a cabinet, comprising:
- a window housing adapted to be mounted within the panel, such that the window housing provides an aperture to the interior of the cabinet and
- an infrared transparent pane adapted to be coupled to the window housing, substantially coextensive with the aperture in the window housing and configured such that the infrared transparent pane is articulatable relative to the panel while allowing the cabinet to remain generally enclosed, wherein the window housing includes an expansion joint.

15. The articulating infrared window kit of claim 14, wherein the expansion joint includes a bellows, the bellows comprising:
- a tubular sleeve including a plurality of pleats to allow all or a portion of the tubular sleeve to extend and retract, a first opening at a first end of the tubular sleeve substantially coextensive with the aperture in the window housing, and a second opening at a second end of the tubular sleeve adapted to receive the infrared transparent pane, the second opening articulatable relative to the first opening by extension and/or contraction of all or a portion of the tubular sleeve.

16. An articulating infrared window kit for installation into a panel of a cabinet, comprising:
- a window housing adapted to be mounted within the panel, such that the window housing provides an aperture to the interior of the cabinet and
- an infrared transparent pane adapted to be coupled to the window housing, substantially coextensive with the aperture in the window housing and configured such that the infrared transparent pane is articulatable relative to the panel while allowing the cabinet to remain generally enclosed, wherein the window housing includes a double gimbal.

17. The articulating infrared window kit of claim 16, wherein the double gimbal comprises:
- a first gimbal adapted to be pivotally coupled relative to the panel and substantially coextensive with the aperture in the window housing, the first gimbal including a first gimbal opening; and
- a second gimbal pivotally coupled to the first gimbal and substantially coextensive with the first gimbal opening, the second gimbal configured to receive the infrared transparent pane.

18. An articulating infrared window kit for installation into a panel of a cabinet, comprising:
- a window housing adapted to be mounted within the panel, such that the window housing provides an aperture to the interior of the cabinet and
- an infrared transparent pane adapted to be coupled to the window housing, substantially coextensive with the aperture in the window housing and configured such that the infrared transparent pane is articulatable relative to the panel while allowing the cabinet to remain generally enclosed, wherein the infrared transparent pane includes a reinforcement mesh within the infrared transparent pane.

19. The articulating infrared window kit of claim 18, wherein the infrared transparent pane comprises a material selected from the group consisting of infrared transmissive glass, Germanium crystal, Calcium Fluoride crystal, Barium Fluoride crystal, other crystal, or infrared transmissive polymer.

20. An articulating infrared window kit for installation into a panel of a cabinet, comprising:
- a window housing adapted to be mounted within the panel, such that the window housing provides an aperture to the interior of the cabinet and
- an infrared transparent pane adapted to be coupled to the window housing, substantially coextensive with the aperture in the window housing and configured such that the infrared transparent pane is articulatable relative to the panel while allowing the cabinet to remain generally enclosed, further comprising one or more reference features for indicating and selecting one or more desired articulated positions of the infrared transparent pane.

21. The articulating infrared window kit of claim 20, wherein the one or more reference features comprises an annular plate installable about the window housing, the annular plate having one or more position marks for indicating the desired articulated positions.

\* \* \* \* \*